Nov. 28, 1967  A. B. WOOD  3,355,082
FINGER-GRIP FOOD-PRODUCT CONTAINERS
Filed April 13, 1965  3 Sheets-Sheet 1
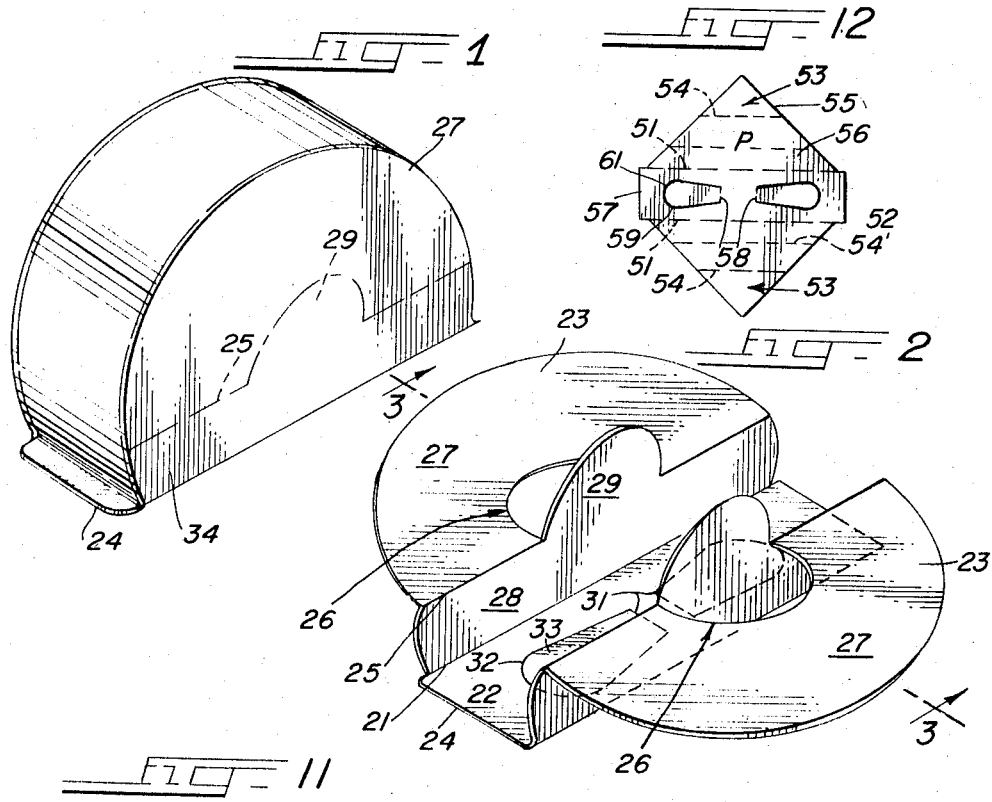
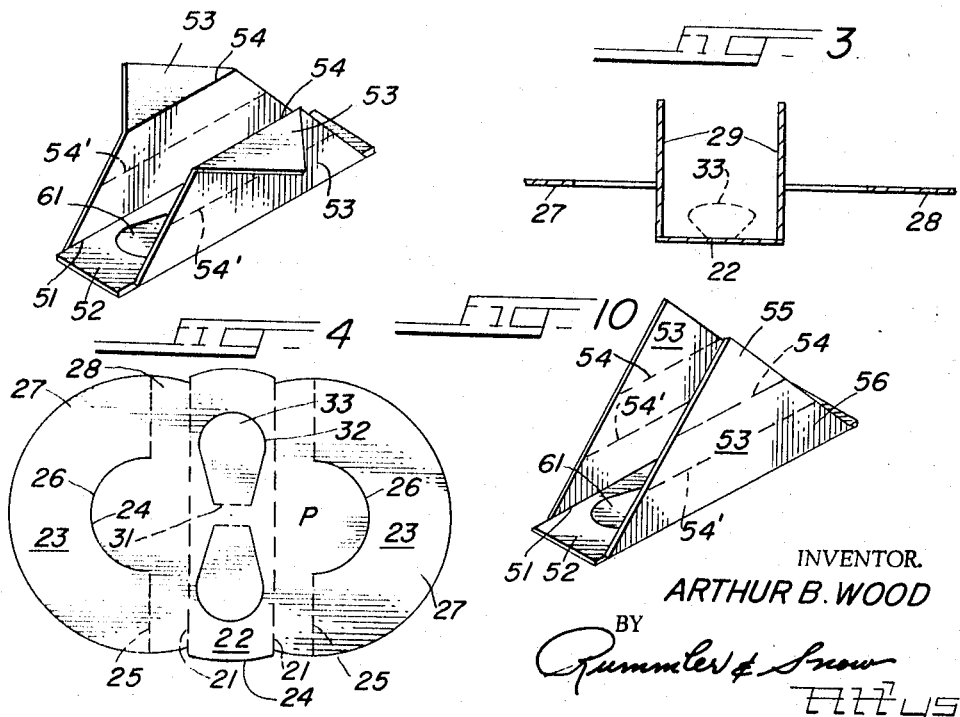
INVENTOR.
ARTHUR B. WOOD
BY
Rummler & Snow
ATT'YS.

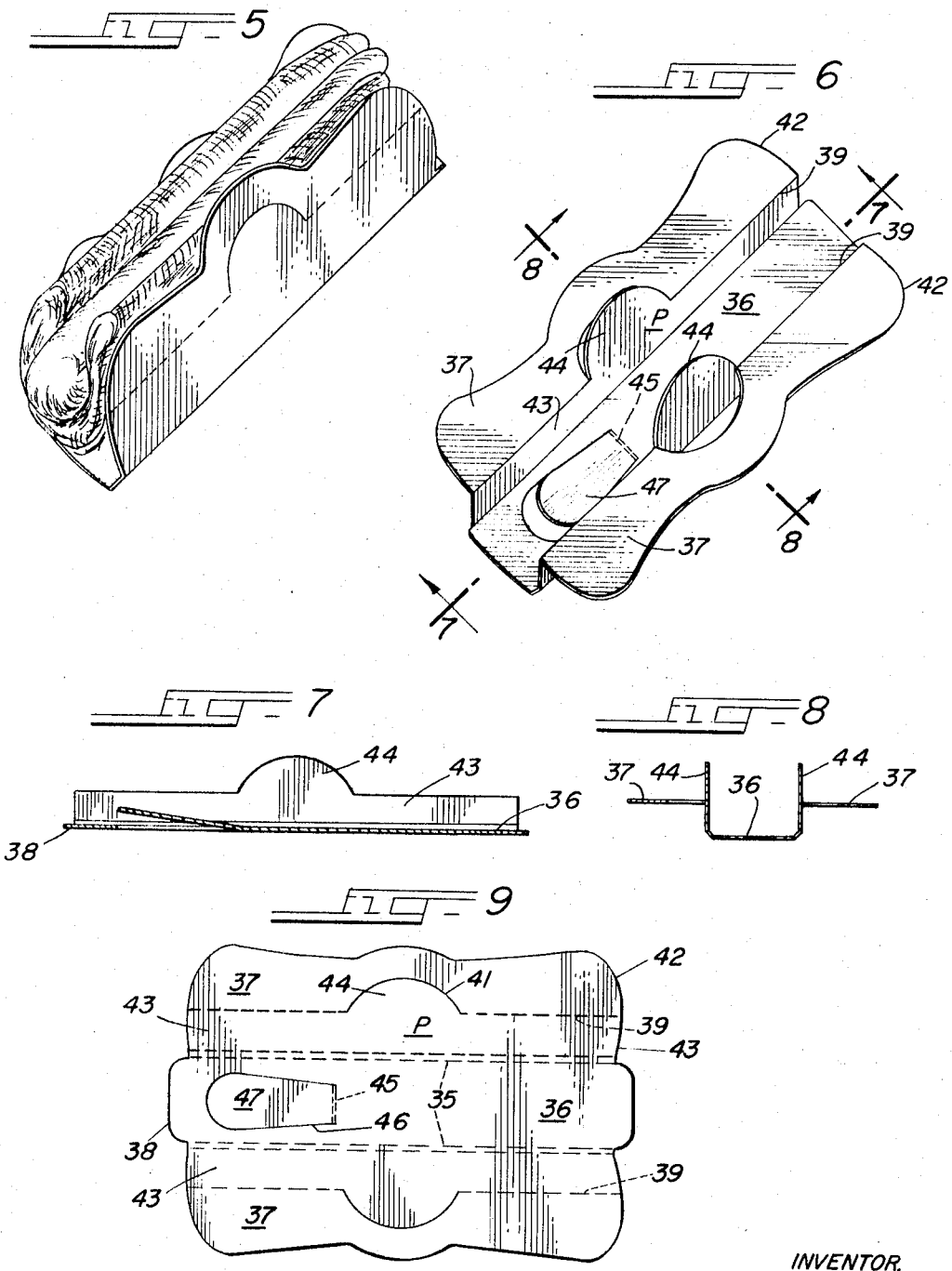

Nov. 28, 1967   A. B. WOOD   3,355,082
FINGER-GRIP FOOD-PRODUCT CONTAINERS
Filed April 13, 1965   3 Sheets-Sheet 3
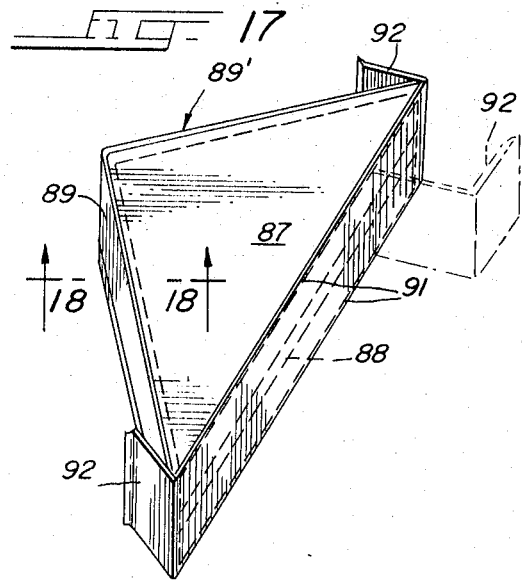
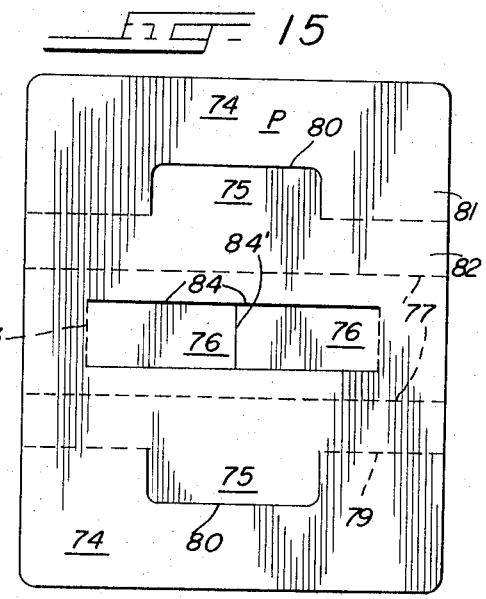
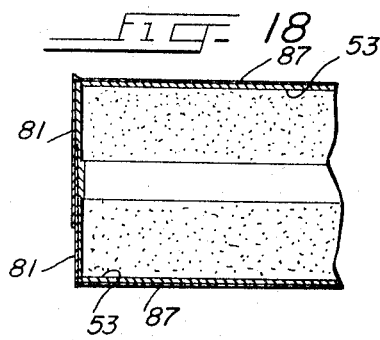
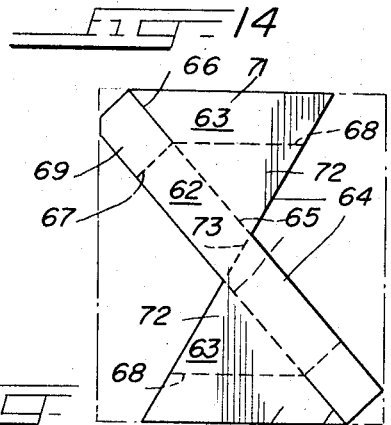
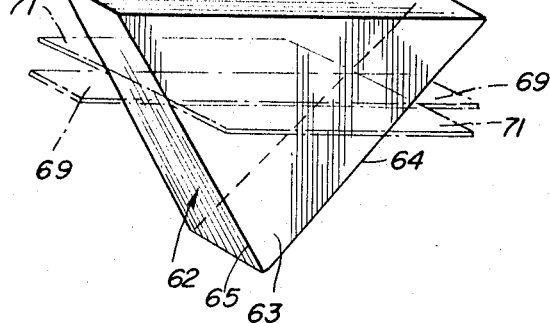
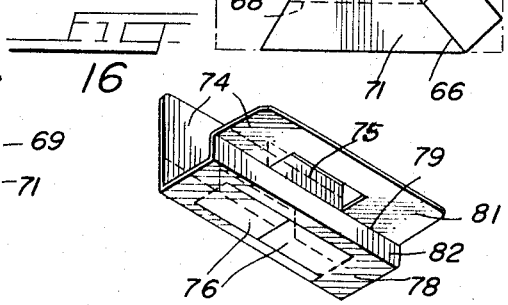
INVENTOR.
ARTHUR B. WOOD
BY
Rummler & Snow
ATTYS.

United States Patent Office 3,355,082
Patented Nov. 28, 1967

3,355,082
FINGER-GRIP FOOD-PRODUCT CONTAINERS
Arthur B. Wood, 192 N. Clark St.,
Chicago, Ill. 60601
Filed Apr. 13, 1965, Ser. No. 447,796
7 Claims. (Cl. 229—16)

This invention relates to containers for food products to be gripped between the fingers of one hand while eating the food product from the container.

The nationwide vogue of eating in motor vehicles, at drive-in stands, and/or at out-of-door outings has created a great demand for food-produce containers that permit eating the food product directly from the container, subject to the immediate disposal of the container into a refuse receptacle. This vogue has stimulated the ingenuity of man to provide containers capable of embracing various types of food products and which will permit the facile eating of the food product from the container. Many types of such containers have appeared on the market with varying degrees of acceptance.

The main objects of this invention are: to provide an improved structuring of various containers for enclosing food products which will permit the containers being held in one hand for easy and gratifying eating of the food product directly from the container; to provide various proved container forms for convenient embracing of various kinds of food products ready for sanitary wrapping and compact packaging for refrigeration or freezing pending the vending thereof; to provide improved containers of this kind which prevent any contact of the fingers with the food product in the course of its complete consumption from the container; to provide improved pattern designs variously contoured, scored and slitted for facile folding into the desired types of container to accommodate various kinds of food products; to provide improved pattern designs of this kind which allow for portions of the container to be folded outwardly away from the food product to facilitate completing the consumption thereof without the need of contact with the fingers with the food product; to provide improved container forms of this kind which, with their embraced food product, permit their convenient enclosure in sanitary wrappers of one kind or another for full protective-packaging of the product and for refrigeration or freezing and subsequent easy removal from the packages and wrappers when access to the food-product is desired for the eating thereof from the container; and to provide a variety of container forms of this kind of such simple structuring as to make very economical the manufacture and marketing thereof and exceedingly gratifying the use thereof by purchasers.

In the several adaptations shown in the accompanying drawings:

FIGURE 1 is a perspective view of a semi-cylindrical type of container, constructed in accordance with this invention enclosing a particular type of food product within one form of a sanitary wrapper;

FIG. 2 is a perspective view of the container of FIG. 1 showing how portions thereof are folded outwardly during the consuming of the food-product;

FIG. 3 is a transverse, sectional view taken on the plane of the line 3—3 of FIG. 2;

FIG. 4 is a reduced plan view of the pattern form for structuring the container of the type shown in FIGS. 1 and 2;

FIG. 5 is a perspective view of an elongated type of container, constructed in accordance with this invention, wherein is embraced a frankfurter in a roll;

FIG. 6 is a perspective view of the container of FIG. 5 showing how portions thereof are folded outwardly during the consuming of the food product;

FIG. 7 is a longitudinal, sectional view taken on the plane of the line 7—7 of FIG. 5;

FIG. 8 is a transverse, sectional view taken on the plane of the line 8—8 of FIG. 6;

FIG. 9 is a plan view of a pattern form for structuring a container of the type shown in FIGS. 5, 6 and 7;

FIG. 10 is a perspective view of a triangular type of container constructed in accordance with this invention;

FIG. 11 is a perspective view showing how portions of the container of FIG. 10 are disposed outwardly during the consuming of the food-product;

FIG. 12 is a plan view of the pattern form for structuring the container of FIGS. 10 and 11;

FIG. 13 is a perspective view of a modified form of container of the type shown in FIG. 10, which provides for a different folding out of portions of the container for access to the food product during the eating thereof;

FIG. 14 is a plan view of a pattern form required for structuring the modified type of container shown in FIG. 13;

FIG. 15 is a plan view of a pattern form required for structuring a still further modified type of container embodying this invention;

FIG. 16 is a reduced, perspective view of a container formed from the pattern shown in FIG. 15 with one side edge folded outwardly for access to the food held therein.

FIG. 17 is a perspective view of a wrapper for use with the container forms of FIGS. 10 and 13; and FIG. 18 is an enlarged fragmentary, cross-sectional view taken on the plane of the line 18—18 of FIG. 17.

The essential concept of this invention involves various U-shaped containers each structured for enclosing a particular type of food product to be consumed directly from the container while it is being held between the fingers of one hand completely out of contact with the food product during such consumption.

Containers embodying the foregoing concept are formed from patterns of flexible material each of a predetermined contour, scoring and slitting to permit facile folding of the pattern into the required U-shaped container for the enclosure of a food product subject to being sealed in a sanitary wrapper and placed in packages subject to refrigeration—or freezing—or may be used in connection with non-refrigerated or frozen food, pending the vending thereof.

The drawings show five different types of containers; one of which is semi-cylindrical in form, two of which are of general rectangular form, and the two others of which are of triangular form. Obviously, other U-shaped forms might be developed also expressive of the herein before stated concept of this invention.

Pattern P, for structuring the aforesaid types of U-shaped containers, are die-cut, or otherwise formed, from thin, flexible pieces of fairly tough, sanitized material which, in planar form, are of selected contours. Each such planar pattern has scores which define a base portion and a pair of flaps. In certain adaptations, hereinshown, the flaps have secondary scores, outwardly of the base portion, to divide the flaps into outer and inner parts. The particular characteristics of each such pattern P will be explained subsequently in the description of each of the several adaptations shown in the drawings.

The pattern P of FIG. 4, for forming the finger-grip, food-product container type of FIGS. 1–3 may be suitably cut from a thin, planar piece of reasonably-tough, sanitized cardboard stock or, possibly, a suitable plastic. As noted above, spaced parallel primary scores 21 define a base portion 22 and a pair of flaps 23. These scores 21 are spaced oppositely outward from and parallel with the shorter median dimension of the pattern P. The flaps 23 are a bit more than semi-circular in contour with the inner ends terminating slightly inward of the extremities of the base portion 22. This provides for short end extensions 24 when the pattern P is folded into container form. (FIGS. 1 and 2). In this instance the flaps 23 have secondary scores 25 and slits 26 dividing the flaps 23 into outer and inner parts 27 and 28, respectively, and tongues 29. The secondary scores 25 are located along substantially the diameter of the contour of the flaps 23 and inwardly terminate at the ends of the respective slits 26. The slits 26 are semi-circular substantially concentric with the contour of the flaps 23.

The base portion 22, in this instance, is formed also with a pair of short, transverse, tertiary scores 31 and oppositely extending loop-shaped slits 32 to define a pair of tabs 33.

For forming a food-product container such as shown in FIG. 1, the pattern P of FIG. 5 is folded along the scores 21 to dispose the flaps 23 substantially parallel and normal to the base portion 22. This forms a crescent-shaped container. The food-product to be enclosed therein could be a sandwich made with a slice of bread from a cylindrical loaf, a bun, etc. Or, the food-product could be one of many frozen desserts. Whatever the food product, such a food-embracing container then would be enveloped in a plastic wrapper 34 and heat sealed in a well known manner, with lines of weakening in the cover for easy stripping such as along the bottom corners, as is well known in the art. A number of such containers would be appropriately packaged and placed in refrigeration pending the vending thereof.

Such a formed food-product container is used in the following manner:

The sanitary wrapper 34 is stripped off. Then the container would be gripped with the thumb and one finger of one hand pressed against the respective tongues 26. The base portion would tend to rest against the remaining fingers on the one hand. The container thus being gripped in the one hand, the other hand may be used to fold the outer parts 27 of the flaps 26 outwardly away from the food product. (FIGS. 2 and 3). Thereupon, the food product becomes readily accessible for eating.

When the food product has been reduced near the level of the secondary scores 25, one of the other fingers of the hand holding the container is shifted under one of the tabs 33 and it may push the tab 33 upwardly from the base portion 22 and permit the remnant of the food product to be consumed.

The pattern P of FIG. 9 for forming the finger-grip food product container of FIGS. 5–8 may be suitably cut from a thin, planar piece of reasonably tough, sanitized cardboard stock or, possibly, a suitable plastic. As noted above, parallel pairs of closely-spaced scores 35 are disposed oppositely adjacent the longitudinal median dimension to define a base portion 36 and a pair of flaps 37. The flaps 37 are of oblong contour with the curved ends terminating slightly inward of the extremities of the base portion 36. This provides for short end extensions 38 when the pattern is folded into container form. (FIGS. 5, 6, 7 and 9). In this adaptation the flaps 37 have secondary scores 39 and slits 41 dividing the flaps 37 into outer and inner parts 42 and 43, respectively, and tongues 44. The secondary scores 39 are located inwardly of the longitudinal median of the respective flaps 37 and inwardly terminate at the ends of the respective slits 41. The slits 41, in this instance, are about quarter circular on a center closely adjacent the respective secondary scores 39.

The base portion 36, in this adaptation of FIG. 9, also is formed with a short, transverse tertiary score 45 and an outwardly-extending loop-shaped slit 46 to define a tab 47.

As is most apparent from FIGS. 5 and 7, a pattern of the form of FIG. 9 is especially adapted for use with an elongated product such as a frankfurter in a roll, or an elongated dessert such as eclairs or the like.

For forming a desired type of food-product container, such as shown in FIG. 5, the pattern of FIG. 9 is folded along the pairs of scores 35 to dispose the flaps 37 substantially parallel and normal to the base portion 36. The food product is set into the thusly-formed container, as shown in FIG. 5. Such a formed food-product container, then would be enveloped in a wrapper of conventional plastic and heat sealed in any well-known manner. A number of such food-product containers would be suitably packaged and, where required, placed in refrigeration pending demand therefor.

Such a formed food-product container is used in the following manner:

The wrapper is stripped off. The container then would be gripped with the thumb and one finger on one hand pressed against the respective tongues 44. The base portion 36 would tend to rest against the one hand. The container being thus firmly gripped in one hand, the other hand may be used to fold the outer parts 42 of the flaps 37 outwardly away from the food product (FIGS. 6 and 8). Thereupon, the food product is accessible for initiating the eating thereof. When, subsequently, there is need to better dispose the food product in position for completing the eating theerof, one of the other fingers of the one hand is shifted to a position under the tab 47 with the other fingers remaining in contact with the tongue 44. Thereupon, the pressing upwardly of the tab 47 will elevate the adjacent end portion of the food product to shift along the container toward the opposite end of the container. Thus the remnant of the food product will be more accessible for completing the eating thereof.

The pattern P for forming the finger-grip, food-product container of FIGS. 10 and 11 may be suitably cut from a thin, planar piece of tough, sanitized, cardboard stock or, possibly, a suitable plastic. As noted above a pair of scores 51 are spaced outwardly opposite from and parallel with one of the median diagonals to define a base portion 52 and a pair of flaps 53. These scores 51 terminate slightly inward from the squared-off base diagonal ends. In this adaptation the flaps 53 each have a secondary score parallel with and intermediate the right-angle points of the flaps 53 and the respective scores 51. The scores 54 and 54′ divide the flaps 53 into outer and inner parts 55 and 56, respectively. The angled sides of the flaps 53 terminate slightly inward of the ends of the base portion 52. This provides for the extensions 57.

The base portion 52, in this adaptation of FIGS. 10, 11 and 12, also is formed with transverse tertiary scores 58 and outwardly-extending, loop-shaped slits 59 to define a pair of tabs 61.

For forming a desired type of food-product container such as shown in FIGS. 10 and 11, the pattern P of FIG. 12 is folded along the scores 51 to dispose the flaps 53 substantially parallel and normal to the base portion 52. The foot product, e.g. a three-cornered sandwich, or a slice of pie, cake, or the like, is set in the thusly-formed container. The container then would be placed in a suitable sanitary wrapper. The simplest form of wrapper would be a piece of conventional sheet plastic folded around the container and heat sealed in any well-known manner. However, a special form of wrapper could be provided, as will be explained presently.

Such a formed food-product container is used in the following manner:

The wrapper, whatever its form, is stripped off. The thumb and one or more fingers on one hand are pressed exteriorly against the inner parts 56 of the flaps 53. The base portion 52 would tend to rest against the one hand. The other hand, then, is free for use to fold outwardly the outer parts 55 of the flaps 53 to facilitate access to the food product for eating. This modfication, like all those preceding and disclosed above, is provided with a tab 61 for elevating the food product from below the area formed by the walls 53 not bent outwardly as has been hereinbefore described.

Another type of triangular-shaped food-product container, formed from a pattern P is shown in FIGS. 13 and 14. This somewhat simulated X-shaped pattern P is suitably cut from a thin piece of reasonably tough, sanitized cardboard stock or, possibly, from a suitable plastic. As the dot-and-dash outlines of FIG. 14 make clear, this pattern is cut out from a rectangular piece of material. The base portion 62 and the pair of flap 63 are defined by parallel edges 64, primary scores 65 and slits 66. Such a base portion 62 is defined by these edges, scores and slits disposed evenly-spaced from and parallel with one diagonal of such an indicated rectangular piece of material. In this adaptation the base portion 62 and flaps 63 have secondary scores 67 and 68, respectively, which define wings 69 at the ends of the base portion 52 and divide the flaps 63 into outer and inner parts 71 and 72. The secondary scores of the flaps 63 are located inwardly parallel of the edge 70 so that the outer part 71 of the flap is of trapezium shape and the inner part 71 is of triangular shape. The transverse score 67 of the base portion 62 are located at the juncture of the scores 65 and 68.

For forming a food-product container such as shown in FIG. 13, the pattern P is folded along the pair of primary scores 65, aligned with the edges 64 and a short score 73 to dispose those two base parts at nearly a right angle, as shown in FIG. 13, with the pair of flaps 63 folded inwardly to dispose the edges 64 of the flaps 63 along the respective edges of the base portion 62. Obviously, such folding of the pattern P into that form could be effected around the food product were it to be a three cornered sandwich, a wedge of pie, cake, or the like. If not so folded around the food-product, the edges 62 could be suitably adhered together.

The food-product container, with the food product embraced therein, would be placed in a suitable sanitary wrapper. The simplest form of wrapper would be a conventional sheet plastic folded around the container and heat sealed in any well-known manner. However, a special form of sanitary wrapper could be provided as will be explained presently.

Such a formed food-product container is used in the following manner:

The wrapper, whatever its form, is stripped off. The thumb and one or more fingers on one hand are pressed exteriorly against the inner parts 72 of the flaps 63. The base portion 62 would then tend to rest against the one hand. The other hand, then, is free for use to fold outwardly the outer parts 71 of the flaps 63 so as to facilitate access to the food product for eating.

Another type of food-product container is formed from a pattern P as shown in FIG. 15. This is somewhat similar to the pattern shown in FIG. 11. However, it has a slightly different marginal contour and a somewhat different form of flaps 74, tongues 75 and tabs 76.

Such a pattern P, as here shown, is slightly oblong in contour. As with the other adaptations this may be suitably cut from a thin, planar piece of reasonably tough, sanitized, cardboard stock or, possibly, a suitable piece of plastic. As noted in FIG. 15 primary scores 77 are spaced oppositely outward from and parallel with the shorter median dimension of the pattern P. These define a base portion 78 and the pair of flaps 74. The flaps 74, thus, are of elongated rectangular form. In this instance the flaps 74 have secondary scores 79 and slits 80 dividing the flaps into outer and inner parts 81 and 82, respectively, and the tongues 75. The secondary scores 79 are located inwardly of the longitudinal median of the respective flaps 74 and terminate at the ends of the respective slits 80. The slits 80, in this instance, are of rectangular contour, matching the contour of the flaps 74, and are located about medially of the longitudinal dimension of the respective flaps 74.

The base portion 78, in this instance, is formed with a pair of short, transverse, tertiary scores 83 and oppositely extending rectangular-shaped slits 84 and 84' to define a pair of tabs 76, extending inwardly toward each other with their inner end abutting.

For forming a food-product container, such as shown in FIG. 16, the pattern P of FIG. 15 is folded along the scores 77 to dispose the flaps 74 substantially parallel and normal to the base portion 78. This forms a rectangular-shaped container. The food-product to be enclosed therein could be an oblong form of sandwich or it could be used to pack some frozen food product. Each such container, then, would be placed in a suitable sanitary wrapper. The simplest form of wrapper would be a conventional sheet plastic folded around the container and heat sealed in any well-known manner. A number of such containers would be appropriately packaged and placed in refrigeration pending the vending thereof, if required.

Such a formed food-product container is used in the following manner:

The sanitary wrapper is stripped off. The container then would be gripped with the thumb and a finger on one hand pressed against the tongues 75. The base portion 78 would tend to rest against the one hand. The container being thus gripped firmly in the one hand, the other hand may be used to fold the outer parts 81 of the flaps 74 outwardly from the food product. (FIG. 16). Thereupon, the product becomes accessible for eating.

When the food product has been reduced near the level of the secondary scores 79, one of the other fingers on the one hand may push the tabs 76 upwardly from the base portion 78 to elevate the remnant of the food-product to be consumed.

For each of the herein shown and described food-product containers a special type of sanitary wrapper could be provided. A specimen of such a wrapper is shown in FIGS. 17 and 18. This is designed particularly for use with either of the formed-containers shown in FIGS. 11 and 13 because of the shape disclosed. Such a wrapper is molded from thin, stable plastic to form two triangular-shaped parts 87 integrated along their base edges with a base part 88. Each of these triangular-shaped parts 77 has a pair of transverse flanges 89, 89' which overlap when the triangular parts 87 are folded into parallel disposition substantially normal to the base part 88, as shown in FIGS. 17 and 18, to embrace a type of food-product container mentioned above. The juncture 91 of the base of these triangular-shaped parts 87 and the base part 88 are slightly weakened, in forming the wrapper, for two reasons. One reason is to make the juncture 91 flexible to permit these two triangular parts 87 to be easily shifted into their opposed parallel relationship. The other reason is to permit the base part 88 to be ripped off easily when access is desired to the food-product container embraced therein. To that end, extensions 92, at the opposite ends of the base part 88, are adapted to be pulled back, as shown in dotted outline in FIG. 17, and the base part 88 ripped away from the flaps 87. This will separate the flaps 87 so that they may be dropped off to obtain access to the embraced food-product container.

The fragmentary, cross-sectional view of FIG. 18 illustrates a meat-type sandwich or a strawberry shortcake embraced in a container of the type shown in FIG. 10 enclosed in the wrapper of the type just described.

Obviously, all the covers for the containers described would preferably be formed to match the contour of the container after the food product is placed therein, and each cover would be provided with tabs or the like to readily strip the cover from the container. Where the food product is of a nature which requires refrigeration and/or freezing, the covers would be of a nature to prevent damage to the product. On the other hand, if the food product was of the nature which only required refrigeration or non-refrigeration, such covers might only be "Saran"-like type plastic to enclose the package.

In any event, the covers, of whatever nature, are used to keep the food product hygienically clean and free from contamination.

It is to be understood that numerous details of this invention may be altered or omitted without departing from the spirit of this invention as defined by the following claims.

I claim:

1. A finger-grip food-product container comprising a base portion, and a pair of transversely-spaced, upwardly-extending flaps of identical contour integrated with the opposite side margins of the base portion, whereby the margins of the respective flaps define an unobstructed opening upwardly from the base, the flaps each having scores spaced upwardly from the base portion permitting a portion of the flaps to be disposed transversely upward, said flaps each having an inverted V-shaped slit extending upwardly from the score to define a tongue for finger contact when a portion of the flaps are disposed outwardly to facilitate eating access to the product with the container gripped between the fingers on one hand.

2. A finger-grip food-product container as set forth in claim 1 wherein the base portion has another score in association with a loop-shaped slit defining a tab for finger contact to facilitate shifting of the remnant of the food product upwardly.

3. A finger-grip food-product container as set forth in claim 1 wherein the flaps are of semi-circular contour.

4. A finger-grip food-product container as set forth in claim 1 wherein the flaps are substantially equal in length.

5. A finger-grip food-product container as set forth in claim 1 wherein the flaps are of triangular contour.

6. A finger-grip food-product-container-forming pattern comprising a piece of thin, flexible material of predetermined contour, having a pair of opposed longitudinally disposed parallel primary scores adjacent one medial dimension to define a base portion between the scores and a pair of flaps outwardly of the scores, the pattern being adapted to be folded along the primary scores to dispose the flaps transversely of the base portion, each flap has a secondary score formed therein outwardly parallel of the base defining scores and looped slits extending oppositely outward from the secondary scores to define tongues to permit outer parts of the flaps to be shifted transversely outward of the container, to embrace a food product subsequently subject to its being eaten when the container is gripped between the thumb and a finger of one hand.

7. A finger-grip food-product container-forming pattern as set forth in claim 6 wherein the base portion of the pattern has formed therein one tertiary score in association with a loop-shaped slit, defining a tab inwardly depressible from the base portion.

References Cited

UNITED STATES PATENTS

| | | | |
|---|---|---|---|
| 1,844,066 | 2/1932 | Hughes. | |
| 1,889,985 | 12/1932 | Hays | 229—22 |
| 2,039,830 | 5/1936 | Owens | 229—22 |
| 2,075,642 | 3/1937 | Potter | 229—8 |
| 2,315,648 | 4/1943 | Nyden | 229—8 |
| 2,591,812 | 4/1952 | Henderson | 229—6 |
| 3,041,643 | 7/1962 | Struble | 229—8 |
| 3,094,264 | 6/1963 | Petrone | 229—8 |

FOREIGN PATENTS 317,968   8/1929   Great Britain.

JOSEPH R. LECLAIR, *Primary Examiner.*

DAVIS T. MOORHEAD, *Examiner.*